Jan. 13, 1959  D. E. GRISWOLD  2,868,226
FUELING AND DEFUELING SYSTEM
Filed May 12, 1953  5 Sheets-Sheet 1

INVENTOR
DAVID E. GRISWOLD
BY *Bacon + Thomas*
ATTORNEYS

FUELING OPERATION

INVENTOR
DAVID E. GRISWOLD

DEFUELING OPERATION

United States Patent Office 2,868,226
Patented Jan. 13, 1959

2,868,226

FUELING AND DEFUELING SYSTEM

David E. Griswold, San Marino, Calif., assignor to Donald G. Griswold, Alhambra, Calif.

Application May 12, 1953, Serial No. 354,446

18 Claims. (Cl. 137—561)

The present invention, in its broader aspects, relates to a two-way valve and to automatic means for controlling the operation of such valve for effecting flow therethrough in opposite directions.

More specifically, the invention relates to a two-way valve and to automatic control means therefor especially adapting said valve ot function as a fueling and defueling valve in a gasoline or jet fuel dispensing system, although it is to be understood that the particular valve and control means disclosed herein is not limited to such use.

The principal object of the invention is to provide an automatic two-way main valve having one inlet and two outlets, and which will function as a pressure reducing valve to maintain a constant presure in a discharge pipe or distribution system connected to the downstream side of one of its discharge outlets, and which will also function as a pressure relief valve to relieve any excess pressure in said discharge pipe or distribution system, due to sudden changes in demand thereon, by permitting the discharge of fluid through its other outlet.

Another object of the invention is to provide a two-way valve adapted for use in a fluid distribution system, and which is automatically operable to drain the system when the flow of fluid to the system is terminated.

A specific object is to provide a fluid pressure operated two-way main valve, including two independent diaphragm-operated valves, one of which will close drip-tight and the other of which will open wide in the event of diaphragm failure.

Another specific object is to provide a fueling and defueling valve having a manually controlled solenoid operated main pilot valve for controlling the operation thereof and which main pilot valve is operable to effect automatic opening of the fueling valve and simultaneous automatic closing of the defueling valve.

Another object is to provide automatic control means for a two-way main valve which is sensitive to pressure on the downstream side of one of the outlets of said valve and which will control the valve to decrease flow therethrough to reduce pressure when the pressure on said downstream side exceeds a predetermined pressure, and which will also function to relieve such excess pressure.

Another object is to provide a unitary valve assembly of a two-way main valve and automatic control means therefor which will require said main valve to maintain a constant discharge pressure on the downstream side thereof and to automatically relieve any excess pressure due to changes in demand.

As illustrative of one operative embodiment of the invention, the same will be described in connection with a fueling and defueling system for aircraft, etc. In general, the system includes a fuel storage tank and a discharge or distribution pipe together with a main valve for controlling flow from said tank to said distribution pipe, and a return pipe for returning fuel from the system to the tank upon completion of a fueling operation, whereby to empty the system and thus avoid a fire hazard. The main valve of the present system comprises two single seated, diaphragm operated globe valves built into a single valve body, the diaphragms being associated with separate pressure chambers so that they are operable independently of each other. One of these globe valves is adapted to serve as a fueling valve, that is to say, it controls the flow of fuel from the fuel storage tank to the distribution pipe, and the other valve is adapted to serve as a defueling valve to effect a reverse flow through the main valve to return fuel from the distribution pipe to the storage tank. The fueling valve is spring loaded to close and is, therefore, normally maintained closed by the force of the spring. On the other hand, the defueling valve is spring loaded to open and is normally held open by the force exerted by the spring. The fueling valve is opened by line pressure acting on one side of its diaphragm in opposition to the spring force acting upon the other side of said diaphragm; whereas, the defueling valve is closed by operating fluid under pressure admitted into its pressure chamber and acting upon its diaphragm in opposition to the spring force tending to maintain the valve open. The opening and closing of the fueling and defueling valves is effected by the admission of operating fluid into and the exhaust of operating fluid from the pressure chambers thereof under the primary control of a manually actuated solenoid operated main pilot valve. One of the features of the main pilot valve is that it includes manually adjustable means for moving the piston of the pilot valve to a position to effect opening of the fueling valve, so that the fueling valve can be opened whenever necessary even though the solenoid coil or the electrical system fails to function.

Other features of the invention comprise the use of a pressure reducing valve or auxiliary automatic pilot valve arranged in a by-pass conduit around the pressure chamber of the fueling valve for regulating the flow of operating fluid to the fueling valve independently of the main pilot valve in such a manner as to cause said main valve to function to maintain a substantially constant pressure in the distribution pipe on the downstream side of said main valve. In addition, pressure relief valves are associated with the pressure chambers of the fueling and defueling valves, respectively, and are arranged in the system so that they are responsive ot pressure conditions on the downstream side of the main valve and operate automatically to cause the fueling valve to move toward closed position, and to allow at least partial opening of the defueling valve when the pressure on the downstream side of the main valve exceeds a given predetermined maximum pressure, the control exerted by the pressure relief valves over the fueling and defueling valves being wholly independent of the main and auxiliary pilot valves.

Other objects and features of the invention will be apparent from the following description taken in conjunction with the accompanying drawings, in which.

Referring now to Figs. 1 to 3 and 10, the two-way main valve is generally identified by the numeral 1 and comprises a body 2 having an inlet opening 3 surrounded by a flange 4 which is connected with a flanged end of a supply pipe 5. The pipe 5 is connected to a fuel storage tank T, schematically shown in Fig. 10, and a conventional pump P is connected in said pipe. The body 2 has a discharge outlet chamber 6 axially aligned with the inlet chamber 3 and surrounded by a flange 7, which in turn is connected with one end of a flanged distribution or delivery pipe 8. The pipe 8 is adapted to be connected with a fluid distributing or dispensing system, not shown.

Figure 11:
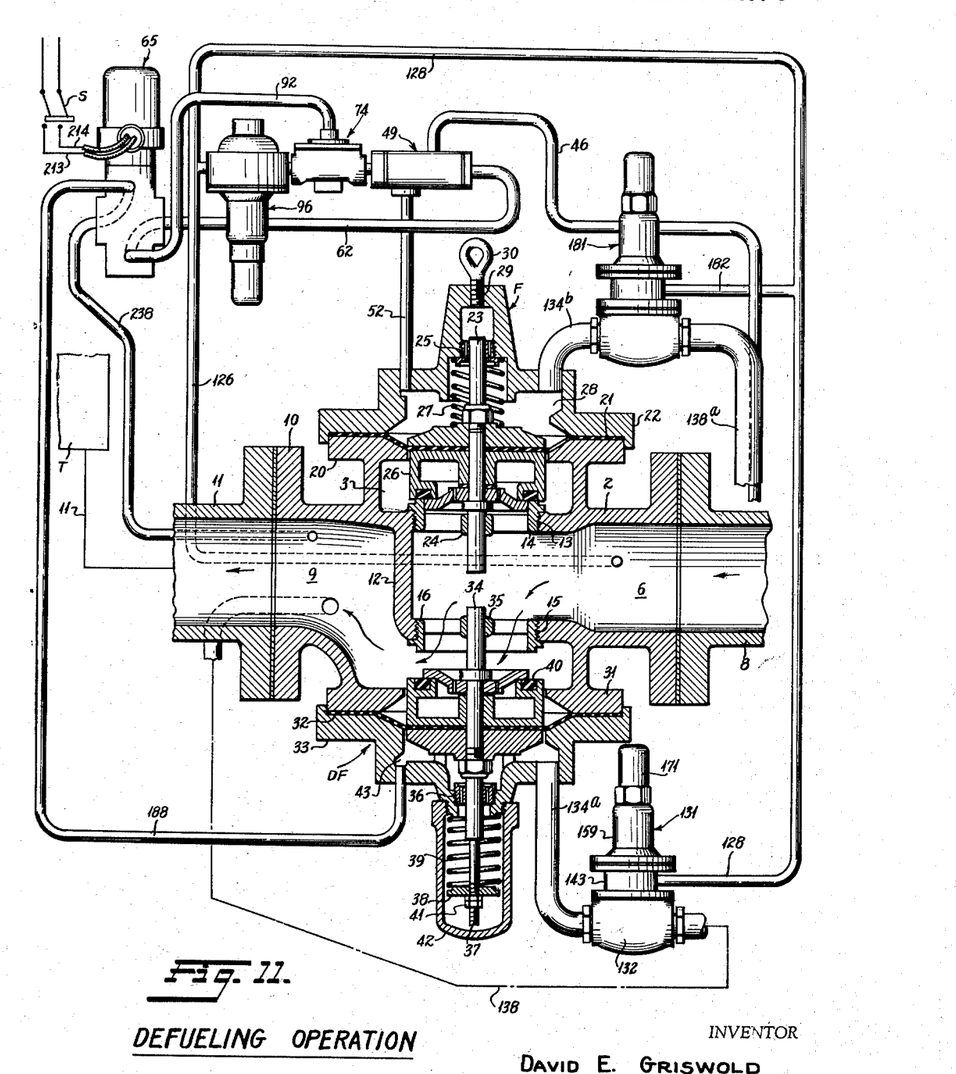
Fig. 11 is a similar view but illustrates the valves and parts in the position they assume during the defueling or reverse flow through the main valve, the view through the main valve being taken on the line 11—11 of Fig. 3.

Referring now particularly to Fig. 11, the valve body 2 has a return or second outlet chamber 9 surrounded by a flange 10, which is connected to one end of a flanged return or defueling pipe 11. The return pipe 11 is also connected with the storage tank T, so that during a defueling operation, or during an operation effecting draining of the pipe 8 and any system connected therewith, the fluid evacuated from such pipe or system is returned to storage. When the valve 1 is connected in a system for dispensing gasoline or jet engine fuel, the draining of the discharge pipe 8 and dispensing system constitutes an important factor contributing to safety because of the elimination of any fire hazard that might otherwise be created.

Figure 10:
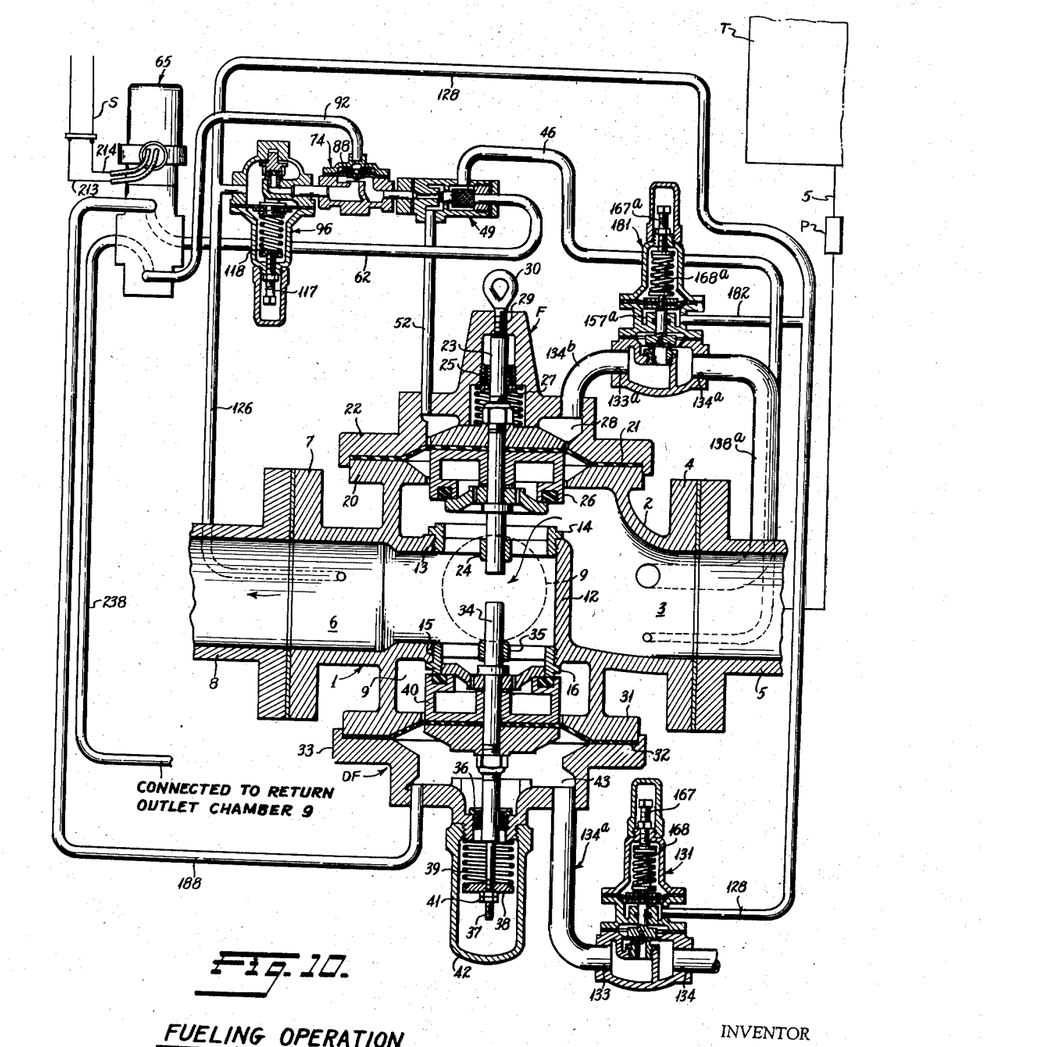
Fig. 10 is a diagrammatic sectional view illustrating the fueling system and the relation of the parts of the fueling and defueling valves and of the several control valves during a normal fueling operation, the view through the main valve being taken on the line 10—10 of Fig. 3.

The valve body 2 with its single inlet 3 and its two outlets 6 and 9 serves as a common housing for two independently operable valves, which for convenience will be referred to hereinafter as a fueling valve F and a defueling valve DF. As is best shown in Figs. 10 and 11, the valve body 2 contains a partition wall 12 which separates the inlet chamber 3 from the respective outlet chambers 6 and 9. Communication between inlet chamber 3 and outlet chamber 6 is established through an opening 13 in the partition 12, a valve seat 14 being mounted in said opening. Similarly, the discharge outlet chamber 6 communicates with the return outlet chamber 9 through an opening 15 in the partition 12 having a valve seat 16 mounted therein. Thus, communication between the inlet chamber 3 and the discharge outlet chamber 6 can be effected only through the valve seat 14 when the valve F is open; whereas, communication between the discharge outlet chambers 6 and return outlet chamber 9 can be effected only through the valve seat 16 when the valve DF is open.

The valve body 2 has a flange 20 comprising a portion of the valve F. A flexible diaphragm 21 overlies the flange 20 and is disposed between said flange and a valve cover 22. A valve stem 23 has its lower end slidably received in a guide 24 formed on the seat 14 and its upper end is slidably received in a guide 25 mounted in the cover 22. A closure or valve disk assembly 26 is secured to the valve stem 23 and to the diaphragm 21 in a conventional manner. A compression spring 27 is disposed in the cover 22 and normally urges the valve disk 26 toward closed position. In other words, the spring 27 normally tends to maintain the valve F closed against any line pressure acting upon the lower side of the disk 26 or the lower side of the diaphragm 21. The diaphragm 21 and the cover 22 cooperate to provide a pressure chamber 28 adapted to receive operating fluid under pressure to supplement the force of the spring 27, to positively maintain the valve F closed when operating conditions so require.

The cover 22 has a threaded opening 29 in which a screw eye or lifting lug 30 is mounted. The lug 30 is provided to enable the complete valve assembly to be readily handled by a crane and is also adapted to be removed from the cover 22 to vent the chamber 28 to atmosphere when the main valve 1 is first placed in operation.

The defueling valve DF also comprises a flange 31 on the valve body 2, a diaphragm 32 and a cover 33. A valve stem 34, axially aligned with the valve stem 23, but totally independent thereof, is slidably mounted in a guide 35 carried by the seat 16 and by a guide 36 mounted in the cover 33. The valve stem 34, however, has an extension 37, which projects through the opening for the valve guide 36 in the cover 33 and has a washer 38 mounted thereon. A compression spring 39 is disposed between the washer 38 and the adjacent end of the cover 33. A closure valve or disk assembly 40 is secured to the valve stem 34 and to the diaphragm 32 in a conventional manner. The spring 39 normally tends to move the valve stem 34 downwardly, as viewed in Figs. 10 and 11, to thereby effect opening of the defueling valve DF. Thus, the spring 27 of the valve F normally tends to maintain the valve F closed; whereas, the spring 39 of the valve DF normally tends to maintain that valve open. The magnitude of the force exerted by the spring 39 tending to open the valve DF can be varied by adjusting a pair of nuts 41 mounted on the stem extension 37. The stem extension 37 and spring 39 are enclosed in a housing 42 detachably mounted upon the cover 33. The diaphragm 32 and the cover 33 cooperate to provide a pressure chamber 43 for operating fluid under pressure to act in opposition to the force of the spring 39 to close the valve DF.

Figure 1:
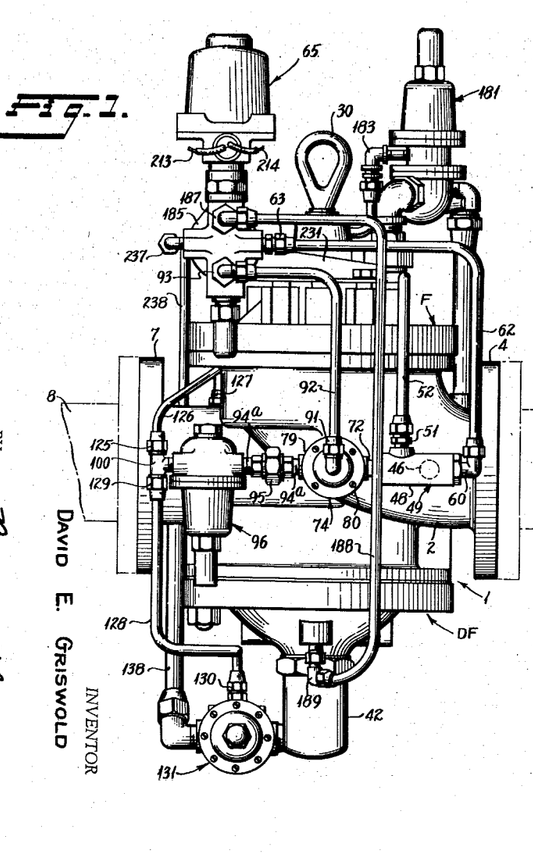
Fig. 1 is a front elevational view of the present two-way main valve and the several valves associated therewith and comprising the control means therefor.
Figure 2:
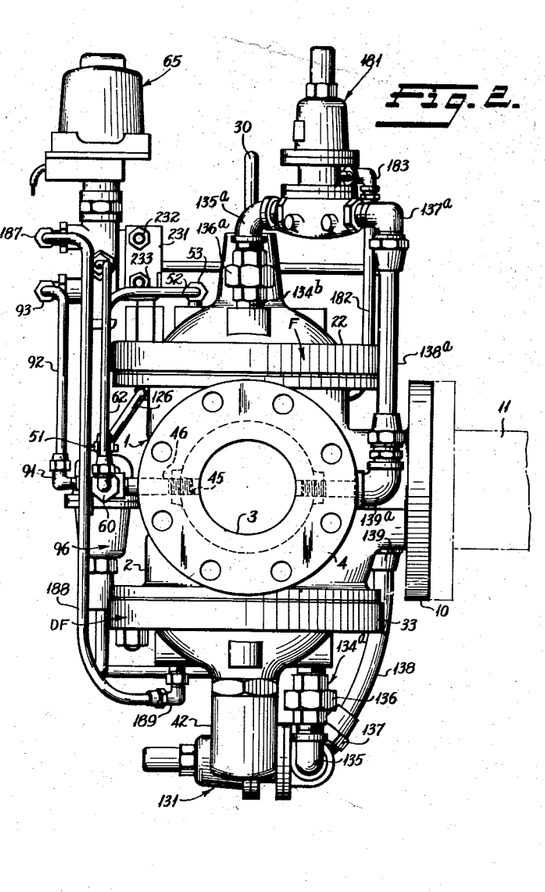
Fig. 2 is a right side elevational view of the valve and control means shown in Fig. 1.
Figure 3:
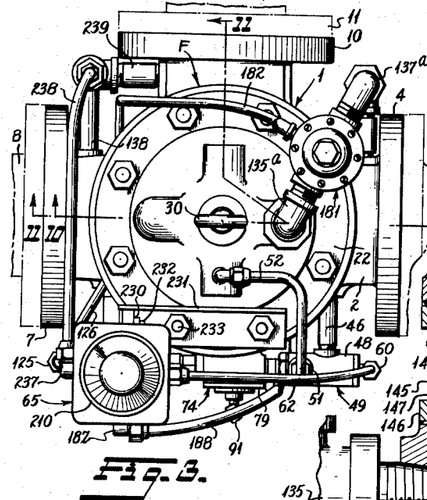
Fig. 3 is a plan view of the valve and control means shown in Figs. 1 and 2.
Figure 9:
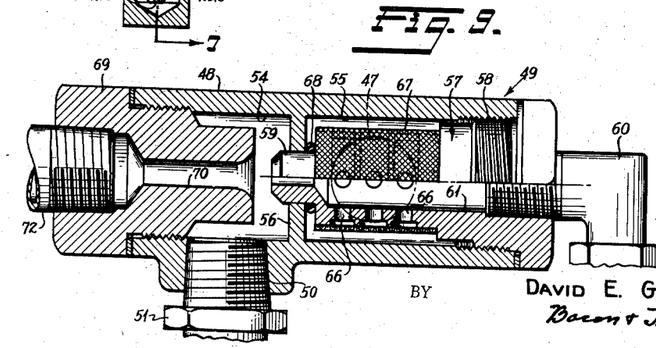
Fig. 9 is a vertical sectional view through the ejector-strainer, which is connected in the by-pass conduit in advance of the fluid pressure operable safety valve shown in Fig. 8.

Referring to Figs. 1 to 3, the valve body 2 has an opening 45 formed therein communicating with the inlet chamber 3. One end of a pipe nipple 46 is mounted in the opening 45 and its opposite end is mounted in an opening 47 formed in a housing 48 of a combined strainer and ejector assembly 49. The housing 48 is shown in longitudinal cross section in Fig. 9 and, as shown has a second laterial opening 50 in which a conventional fitting 51 is mounted and connects one end of a conduit 52 to the housing 48. The opposite end of the conduit 52 is connected by a conventional fitting 53 to the cover 22 of the fueling valve F, so that communication is established between the strainer assembly 49 and the pressure chamber 28 of said valve through the conduit 52.

The opening 50 (Fig. 9) communicates with a chamber 54 in the housing 48 and the opening 47 communicates with a chamber 55 in said housing, the chambers 54 and 55 being separated by a transverse wall 56. A strainer assembly 57 is mounted in a threaded opening 58 at the outer end of the chamber 55 and includes a nozzle portion 59 that extends through the wall 56 into the chamber 54. A conventional angle fitting 60 is mounted in the threaded outer end of a bore 61 in the strainer assembly 57 and has one end of a conduit 62 (Fig. 1) connected thereto. The opposite end of the conduit 62 is connected by a conventional fitting 63 (Fig. 7) to a threaded opening 64 in a four-way solenoid operated main pilot valve 65. The solenoid valve 65 will be described in greater detail later. The body of the strainer assembly 57 (Fig. 9) is also provided with radial passageways 66 surrounded by a screen 67, which prevents foreign matter from passing from the inlet chamber 3 of the main valve 1 into the bore 61 and through the nozzle 59. A gasket 68 surrounds the nozzle portion 53 and forms a seal between the wall 56 and the adjacent end of the body of the strainer 51.

The outer end of the chamber 54 is threaded and a plug 69 is mounted therein. The plug 69 has a passageway 70 axially aligned with, but spaced from, the orifice of the nozzle portion 59, whereby the nozzle 59 and the plug 69 function as an ejector for rapidly withdrawing operating fluid from the pressure chamber 28 of the fueling valve F through the conduit 52 when the valve F is to be opened. The outer end of the passage 70 is enlarged and threaded for the reception of one end of a conventional pipe nipple 72, the opposite end of which is connected to the inlet chamber 73 (Fig. 8) of a fluid pressure operated "fail safe" valve generally identified by the numeral 74.

Figure 8:
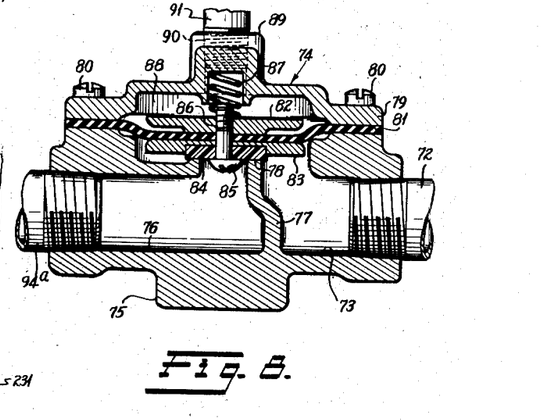
Fig. 8 is a vertical sectional view through a fluid pressure operated safety control valve, which is connected in the above mentioned by-pass conduit in advance of the auxiliary pilot or pressure reducing valve.

The valve 74 comprises a body 75 having an outlet chamber 76 axially aligned with the inlet chamber 73. The inlet chamber 73 and the outlet chamber 76 are separated by a partition 77 provided with a seat 78. A cover 79 is mounted on the valve body 75 by a plurality of screws 80, a flexible diaphragm 81 being interposed between the valve body and cover. Diaphragm supporting washers 82 and 83 are arranged above and below the diaphragm 81, the lower washer 83 being recessed to receive a resilient valve disk 84. A screw 85 extends through the valve disk 84, the washer 83, the diaphragm 81 and is threaded into an opening 86 in the washer 82 for securing the valve disk and washers in assembled relation with the diaphragm 81. A compression spring 87 is disposed between the washer 82 and the cover 79 and normally urges the disk 84 toward the seat 78 to close the valve 74. Thus, the valve 74 is a normally closed valve. The cover 79 is recessed and cooperates with the diaphragm 81 to provide a pressure chamber 88 to receive operating fluid for positively holding the valve 74 closed against line pressure.

The cover 79 is provided with a boss 89 having a threaded opening 90 in which a conventional fitting 91 is mounted. One end of a conduit 92 (Fig. 1) is connected to the fitting 91 and its opposite end is connected to a fitting 93 mounted in a port 94 (Fig. 6) formed in the body of the solenoid valve 65.

The outlet chamber 76 (Fig. 8) of the valve 74 is connected by conventional pipe nipples 94ª and union 95 (Fig. 1) with a pressure reducing or auxiliary pilot valve generally identified by the numeral 96. The valve 96 is shown in cross section in Fig. 4 to which reference may now be made, and comprises a body 97 having an inlet passage 98 connected with the pipe nipple 94ª and union 95 and has a threaded outlet opening 99 which is connected with the stem of a conventional pipe-T 100. A partition 101 extends inwardly from the inlet opening 98 and has a seat 102 mounted thereon. A cover 103 has a flange 104 engaged with a flexible diaphragm 105 interposed between said flange and the adjacent face of the valve body 97. A plurality of screws 106 extend through openings in the flange 104 and diaphragm 105 and mount the cover 103 and diaphragm 105 in assembled leakproof relation on the valve body 97.

Figure 4:
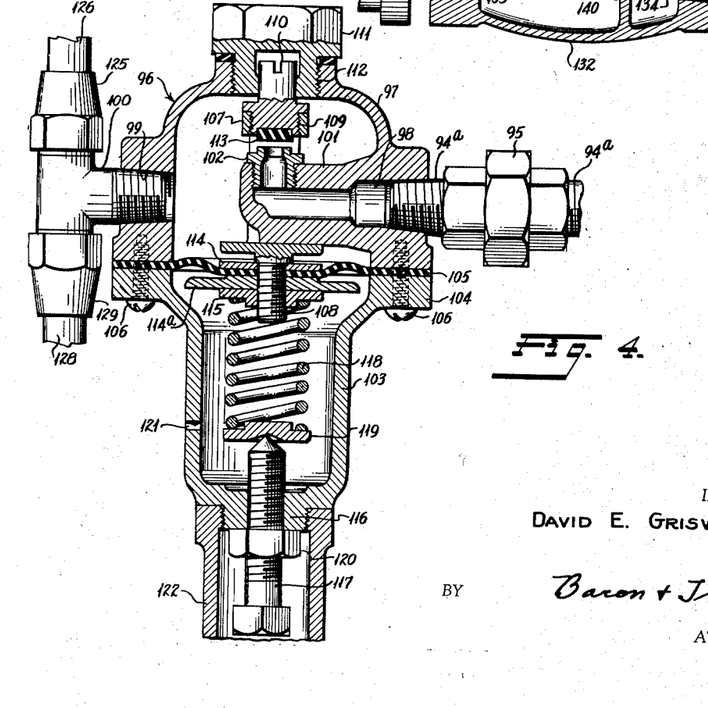
Fig. 4 is a vertical sectional view through the pressure reducing valve or auxiliary pilot valve, which is connected in the by-pass conduit around the pressure chamber of the fueling valve.

A yoke 107 surrounds the partition 101 and carries a projecting valve stem part 108. The yoke 107 also has a threaded opening 109 in which one end of another valve stem part 110 is mounted. The stem part 110 is slidably received and guided in a plug 111 mounted in a threaded opening 112 in the valve body 97. The stem part 110 is recessed on its face adjacent the seat 102 to receive a valve disk 113 cooperable with said seat to control the flow or by-passing of operating fluid from the inlet opening 98 to the outlet opening 99 of the valve 96. The valve stem part 108 is threaded and extends through a central opening in the diaphragm 105 and through diaphragm washers 114 and 114ª which engage opposite sides of the diaphragm 105. A nut 115 is threaded on the stem 108 for tightly clamping the diaphragm 105 to the yoke 107 and between the washers 114 and 114ª.

The cover 103 has an apertured threaded boss 116 in which an adjusting screw 117 is mounted. One end of a compression spring 118 is engaged with the nut 115 and the other end is engaged with a disk 119 in abutment with the inner end of the adjusting screw 117. A nut 120 is adapted to be jammed against the boss 116 to hold the screw 117 in adjusted position. The cover 103 has an opening 121 for venting the interior of said cover to the atmosphere. The adjusting screw 117 and the nut 120 are enclosed by a housing 122 threadedly mounted upon the exterior of the boss 116.

The valve 96 is normally held open by the force of the compression spring 118 and is so illustrated in Fig. 4. The screw 117 is adjusted to set the valve 96 so that it will automatically close when a predetermined hydraulic pressure is established in the outlet opening 99, as will be explained more fully hereinafter.

Referring to Fig. 1, a fitting 125 connects one end of a conduit 126 to one end of the pipe-T 100. The opposite end of the conduit 126 is connected by a conventional fitting 127 with the discharge outlet chamber 6 of the valve F. Thus, the pipe nipple 46, the ejector-strainer 49, the valve 74, the valve 96, and the conduit 126 comprise a by-pass line or conduit interconnecting the inlet chamber 3 of the main valve with the discharge outlet chamber 6 in by-passing relation to the pressure chamber 28 of the valve F. It will be equally apparent that when either the valve 74 or the valve 96 is fully closed, the by-passing of fluid around the pressure chamber 28 of the valve F will be interrupted and the fluid will be required to flow through the conduit 52 to said pressure chamber to effect positive closing of said fueling valve, by pressure acting upon the diaphragm 21 and forcing the disk 26 into engagement with the seat 14. In a normal fueling operation, however, the valve 74 is permitted to open under line pressure and the valve 96 modulates to vary the volume of fluid that can flow through the by-pass line in accordance with pressure conditions on the downstream side of the valve F, and in this manner controls the volume of fluid that is required to flow to the pressure chamber 28 of the fueling valve F to maintain a constant pressure on the downstream side of said fueling valve.

A conduit 128 (Fig. 1) is connected by a conventional fitting 129 to the opposite end of the pipe-T 100 and the opposite end of said conduit is connected by a fitting 130 with a pressure relief valve generally identified by the numeral 131. The valve 131 is shown in vertical cross section in Fig. 5, to which reference may now be made, and comprises a body 132 having a threaded inlet opening 133 and a threaded outlet opening 134. The inlet opening 133 is connected by a conduit 134ª (Figs. 2, 10 and 11), comprising an elbow 135, a union 136 and suitable pipe nipples, with the pressure chamber 43 of the defueling valve DF. The outlet 134 of the valve 131 has a conventional fitting 137 mounted therein and connects one end of a conduit 138 with said outlet. The opposite end of the conduit 138 is connected by a conventional fitting 139 with the return outlet chamber 9 of the defueling valve DF. A partition 140 (Fig. 5) in the body 132 separates the inlet and outlet openings 133 and 134 and serves as a support for an annular valve seat 141.

Figure 5:
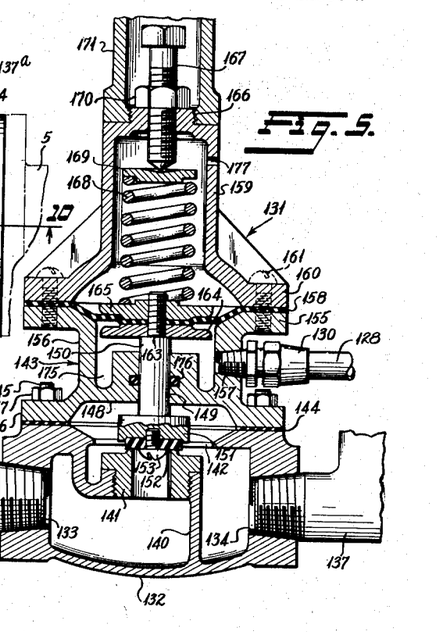
Figs. 5 is a vertical sectional view through a pressure relief valve of the type employed herein to control the operation of the fueling and defueling valves during a fueling operation in accordance with pressure variations on the downstream side of the fueling valve, and independently of the manually controlled, solenoid operated main pilot valve and auxiliary pilot valve.

The body 132 has a central opening 142 axially aligned with the seat 141. A generally spool-shaped intermediate valve section 143 is disposed above the valve body 132 and an annular gasket 144 is disposed between said valve section and body. A plurality of studs 145 is mounted in the body 132 and these extend through suitable openings in the gasket 144 and through a flange 146 at the lower end of the intermediate section 143. Nuts 147 are mounted on the studs 145 to secure the valve section 143, the gasket 144 and the valve body 132 together in leakproof relation. The intermediate section 143 has a transverse wall 148 provided with an opening 149 in which a valve stem 150 is slidably mounted. The valve stem 150 has a recessed enlargement 151 at its lower end which carries a valve disk 152 secured in place by a screw 153. The valve disk 152 is adapted to engage the seat 141 to shut off flow through the valve 131. The intermediate section 143 has a flange 155 at its upper end which is connected with the lower flange 146 by a cylindrical portion 156. The cylindrical portion 156 has a threaded opening 157 in which the fitting 130, previously referred to, is mounted. A flexible diaphragm 158 overlies the flange 155, and a cover 159 has a flange 160 engaged with the upper side of said diaphragm. A plurality of screws 161 secure the cover 159 and the diaphragm 158 to the flange 155.

The valve stem 150 has a shoulder 163 disposed above the transverse wall 148 adapted to form an abutment for a diaphragm supporting washer 164 at the lower side of the diaphragm 158. A similar washer 165 is mounted upon the stem 150 above the diaphragm 158 and is internally threaded so that it serves as a clamping nut for securing the diaphragm 158 to the valve stem 150. The cover 159 has an internally threaded boss 166 in which an adjusting screw 167 is mounted. A compression spring 168 is disposed within the cover 159 and its lower end is engaged with the washer 165 and its upper end is engaged with a disk 169 that bears against the inner end of the adjusting screw 167. A jam nut 170 locks the screw 167 in adjusted position. A housing 171 is mounted upon threads on the exterior of the boss 166 and encloses the screw 167 and the nut 170.

The intermediate section 143 provides a pressure chamber 175 below the diaphragm 158 and above the wall 148, which is in constant communication with the outlet 99 of the valve 96 through the conduit 128. An O-ring packing 176 is mounted in the transverse wall 148 and forms a seal around the valve stem 150 between the outlet chamber 134 and the pressure chamber 175. The housing 159 has a vent opening 177, which subjects the upper side of the diaphragm 158 to atmospheric pressure.

It will be apparent from Figs. 1, 2, 9 and 10 that the pressure in the discharge outlet chamber 6 of the fueling valve F is communicated through the conduits 126 and 128 to the pressure chamber 175 of the valve 131, so that the valve 131 is automatically responsive to pressure changes in the pipe line 8 on the downstream side of the fueling valve F. The screw 167 may be adjusted for any desired set pressure within the capacity of the valve 131, but preferably is adjusted in the manner described hereinafter. It will be apparent that when the valve 131 is open, operating fluid can escape from the pressure chamber 43 through conduits 134ª and 138 to the return outlet 9 of the defueling valve DF and permit the spring 39 to open the valve DF to relieve excessive pressure in the distribution pipe 8.

A pressure relief type valve 181 similar to the valve 131 is connected with the main valve 1 so that it is simultaneously operable with the valve 131 in accordance with pressure changes on the downstream side of the fueling valve F. In the interest of brevity in description, the corresponding parts of the valve 181 will be referred to hereinafter by the same reference numerals but with the exponent "a" added thereto. Thus, the pressure chamber 157a has one end of a conduit 182 connected thereto by a conventional fitting 183. The opposite end of said conduit is connected with the outlet chamber 6 of the fueling valve F. This is diagrammatically indicated in Figs. 10 and 11 by showing the conduit 182 in communication with the conduit 128, which latter is connected at one of its ends with the outlet chamber 6. The opening 133a of the valve 181 is connected by a conduit 134b (Fig. 2), comprising an elbow 135a, a union 136a and conventional nipples, with the pressure chamber 28 of the fueling valve F. The opening 134a has a conventional fitting 137a mounted therein and connects one end of a conduit 138a with the valve 181. Conventional pipe fittings 139a connect the conduit 138a with the inlet chamber 3 of the valve body 2. It will be apparent that when the valve 181 is open, fluid can flow from the inlet chamber 3 to the pressure chamber 28 of the valve F to positively move the valve disk 26 toward closed position against line pressure.

Figure 6:
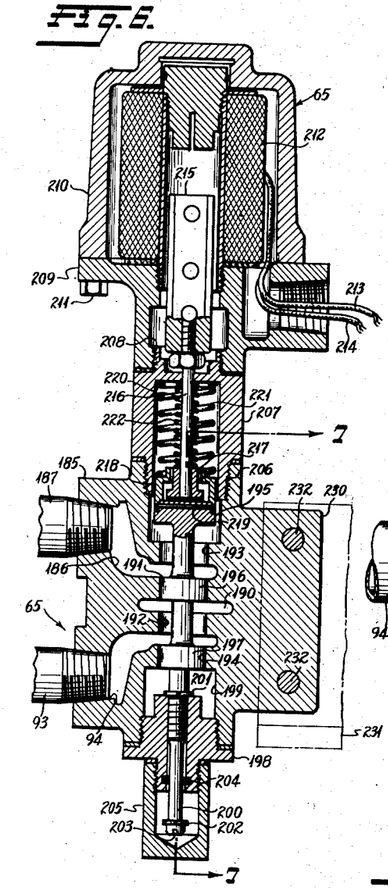
Fig. 6 is a vertical sectional view through the solenoid operated main pilot valve.
Figure 7:
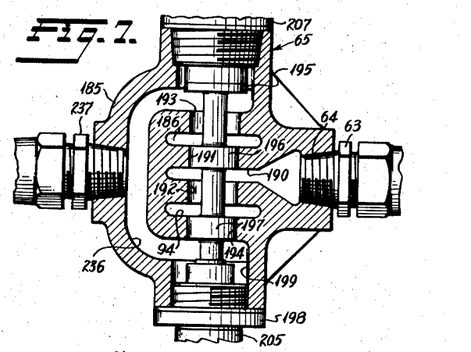
Fig. 7 is a similar view through the main pilot valve taken on the line 7—7 of Fig. 6.

The solenoid valve 65, previously referred to, is shown in cross section in Figs. 6 and 7. The valve 65 includes a body portion 185 having the fitting 93, previously described, mounted in the port 94 at the front of said body. A similar port 186, disposed above the port 94, has a conventional fitting 187 mounted therein and connects one end of a conduit 188 (Fig. 1) to the valve body 185. The opposite end of the conduit 188 is connected by a conventional fitting 189 to the cover 33 of the defueling valve DF, to thus establish communication between the port 186 of the pilot valve 65 and the pressure chamber 43 of the defueling valve DF. The valve body 185 has a central port 190 (Figs. 6 and 7) in communication with the opening 64 and disposed between circular ports 191 and 192 adjacent the ports 186 and 94, respectively. Another circular port 193 is disposed above the port 191 and a similar port 194 is disposed below the port 192.

A stem 195 has piston portions 196 and 197 slidably mounted relative to the ports 191 to 194. A plug 198 is mounted in an opening 199 in the valve body 185 and is internally threaded to receive a rod 200. A snap ring 201 is mounted upon the stem 195 adjacent to the lower end thereof and engages the plug 198 and serves as an abutment to limit downward movement of the stem 195. The rod 200 is adjusted in the plug 198 so that its upper end is adjacent the lower end of the stem 195. A stop ring 202 is mounted upon the rod 200, and the lower end of said rod is slotted as indicated at 203 to receive the working end of a screw driver (not shown). The purpose of the rod 200 is to enable the stem 195 to be actuated to energized position by manual manipulation of the rod 200. An O-ring 204 mounted in the plug 198 in surrounding relation to the rod 200 forms a seal around said rod. A cap 205 is mounted upon the plug 198 and encloses the lower end of the rod 200.

The upper end of the valve body 185 is provided with a threaded opening 206 in which one end of a valve bonnet 207 is mounted. The upper end of the bonnet 207 is threaded into a central opening 208 in a solenoid base 209. A cup 210 is secured to the base 209 by a plurality of cap screws 211. The cup 210 encloses the usual solenoid coil 212 having lead wires 213 and 214 attached thereto. Current flow to the coil 212 is controlled by a manually operable switch S, diagrammatically shown in Figs. 10 and 11. An armature 215 is disposed within the coil 212 and the upper end of a valve stem actuating rod 216 is connected thereto. The lower end of the rod 216 is loosely connected to the valve stem 195 by means of an abutment 217 secured to the lower end of the rod 216 and a cup member 218 is secured to the valve stem 195 by a pin 219. The bonnet 207 has a transverse wall 220 acting against the cup 218 to urge the valve stem 195 downwardly, and which wall also serves as an abutment for a similar but smaller spring 222 which engages the enlargement 217 on the rod 216 for urging the rod and armature downwardly upon opening of the switch S and the de-energization of the coil 212.

The solenoid valve body 185 has a rearwardly extending flange 230 (Figs. 1 to 3, and 7), which is secured to a bracket 231 by bolts 232. The bracket 231, in turn, is secured to studs 233 projecting from the valve cover 22.

Referring now to Fig. 7, the valve body 185 has a lateral port 236 formed at the side of said body opposite the opening 64 and port 190, the port 236 being threaded at its outer end to receive a fitting 237 (Figs. 1 and 3), which connects one end of a conduit 238 to the valve body 185. The opposite end of the conduit 238 is connected by conventional pipe fittings, generally identified by the numeral 239, to the outlet chamber 9 of the defueling valve DF.

The automatic fueling and defueling apparatus described hereinbefore comprises a unitary assembly of the two-way main valve 1 embodying the fueling valve F, the defueling valve DF, the solenoid operated main pilot valve 65, the auxiliary or pressure reducing pilot valve 96 for effecting closing movement of the fueling valve during a fueling operation whenever the pressure on the downstream side of said fueling valve rises above the setting of said pressure reducing pilot valve 96, the two pressure relief valves 131 and 181, which control the opening and closing of the fueling and defueling valves F and DF, respectively, independently of the main pilot valve, but in response to changes in pressure on the downstream side of the fueling valve, the pressure responsive by-pass control valve 74, and the ejector-strainer 49, which facilitates quick opening of the fueling valve in response to a sudden increase in demand on the downstream side of the fueling valve.

It will be understood that the spring 118 of the valve 96, the spring 168 of the valve 131, and the spring 168a of the valve 181 may be adjusted to maintain any desired constant pressure in the distribution pipe 8 during a fueling operation. Ordinarily, the inlet pressure in the inlet chamber 3 should be at least ten pounds higher than the desired delivery pressure from the distribution pipe 8. The adjusting screw 117 of the valve 96 is initially adjusted with the aid of a pressure gauge (not shown), during a fueling operation, until the pressure in the pipe 8 is about ten pounds per square inch higher than the desired constant pressure. The adjusting screw 167a of the valve 181 is then adjusted until the needle of the gauge begins to dip downwardly. The adjusting screw 117 of the valve 96 is then readjusted until the gauge pressure is reduced to a point about five pounds per square inch higher than the desired delivery pressure. The adjusting screw 167 of the valve 131 is then adjusted until the needle of the gauge again begins to dip downwardly. The final adjustment is effected by again adjusting the screw 117 of the valve 96 until the gauge indicates the constant pressure desired. The several adjusting screws, of course, are locked in adjusted position by tightening their associated lock nuts.

In the normal operation of the fueling and defueling system described herein, whenever a fueling operation is desired, the switch S is manually closed to energize the coil 212 of the solenoid valve 65. Conversely, when a fueling operation is to be discontinued, the switch S is manually opened and the solenoid coil 212 is de-energized.

When the stem 195 is in the defueling position shown in Fig. 6, that is to say, when solenoid valve 65 is de-energized, the ports 94 and 190 are in communication, so that operating fluid under pressure delivered to the pilot valve 65 by the conduit 62 is permitted to flow through the conduit 92 to the pressure chamber 88 of the valve 74 to effect closing of said valve. Upon closing of the valve 74, operating fluid is prevented from by-passing the pressure chamber 28 and is caused to flow through the branch conduit 52, associated with the strainer ejector assembly 49, to the pressure chamber 28 of the fueling valve F to exert pressure downwardly on the diaphragm 91 to effect closing of the valve F. Simultaneously, operating fluid is exhausted from the pressure chamber 43 of the defueling valve DF through the conduit 188 to the port 186 of the pilot valve 65, then through the port 236 and conduit 238 for ultimate discharge into the return outlet chamber 9 of the defueling valve DF (see Fig. 11), thereby permitting the spring 39 to force the valve stem 34 downwardly to move the closure member 40 away from its seat 16 to thereby effect opening of the defueling valve DF.

Thus, when the solenoid operated valve 65 is de-energized, the fueling valve F is automatically and positively closed and the defueling valve DF is automatically opened. On the other hand, when the solenoid valve 65 is energized by closing of the switch S, the valve stem 195 is raised by the armature 215 so that the piston portion 196 is received in the port 193 and the piston portion 197 is received in the port 192. The flow through the valve body 185 is then altered so that operating fluid under pressure, delivered to the port 190 through the conduit 62, flows through the port 186 and conduit 188 to the pressure chamber 43 of the defueling valve DF to thereby close said valve. At the same time, operating fluid is exhausted from the pressure chamber 88 of the valve 74 through the conduit 92, the ports 94 and 236 in the valve 185 and the conduit 238, thereby permitting the valve 74 to open and allow operating fluid to escape from the pressure chamber 28 of the fueling valve F to permit opening of asid valve.

At this time, the nozzle 59 of the ejector-strainer 49 serves as a primary jet and the orifice 70 in the plug 69 serves as a secondary jet. The flow of fluid from the primary to the secondary jets creates a reduced pressure zone in the chamber 54 and causes operating fluid to be withdrawn from the pressure chamber 28 of the fueling valve F at a rapid rate through the branch conduit 52 to thereby effect quick opening of the fueling valve F.

The rate of flow of operating fluid from the pressure chamber 28 is further controlled in accordance with the extent of opening of the valve 96, as determined by the pressure on the downstream side of the fueling valve F. Thus, when the pressure on the outlet side of the valve F acting upon the upper side of the diaphragm 105 exceeds the set force of the compression spring 118, the yoke 107 will be lowered, as viewed in Fig. 4, to move the disk 113 toward the seat 109 to reduce flow through the valve. Conversely, when the pressure on the diaphragm 105 drops below the setting of the spring 118, said spring will move the yoke 107 upwardly to open the valve. Thus, the valve 96 will automatically open and close, more or less, in accordance with pressure changes in the outlet chamber 6 of the valve F corresponding to changes in the demand on the downstream side of said valve during the fueling operation.

The flow capacity of the valve 96 exceeds the maximum flow capacity of the nozzle 59, so that pressure cannot build up in the chamber 28 of the valve F to effect closing of said valve when the valve 96 is open to any appreciable extent. However, in the normal operation of the pipe line 8, the valve 96 will remain open more or less to permit operating fluid to continuously flow around or by-pass the pressure chamber 28 of the fueling valve F when pressure conditions on the downstream side of said valve do not require closing of the valve F. However, the valve 96 will fully close or partially close to cause operating fluid under pressure to pass through the conduit 52 to build up pressure in the pressure chamber 28 to effect partial or complete closing of the valve F, as pressure conditions on the downstream side of said valve require, all in order to maintain a substantially constant pressure on the downstream side of the main valve.

The valves 131 and 181 are normally closed at this time and are held closed by their respective springs 168 and 168a. The valves 131 and 181 will remain closed so long as the pressure in the pipe line 8 does not exceed that for which these valves have been set. Should the pressure on the downstream side of the main valve 1 increase suddenly to a pressure in excess of that for which the control valves have been set, then valves 131 and 181 will open simultaneously, the valve 131 opening to exhaust operating fluid under pressure from the pressure chamber 43 of the defueling valve DF to permit said valve to automatically open to relieve the excess pressure condition in the pipe line 8, while the valve 181 will open to permit operating fluid under pressure to flow to the pressure chamber 28 of the fueling valve F to partially or completely close said valve to thereby decrease the pressure and rate of flow of fuel through the valve into the pipe line 8. Should the pressure conditions in the pipe line 8 be such as to require complete closing of the fueling valve F, then the valve 181 will remain open to effect such closing. Simultaneously the valve 131 will open and remain open until the spring 39 forces the defueling valve DF to its full open position to thereby relieve the excess pressure in the line.

When a fueling operation has been completed, the switch S is manually opened and the solenoid valve 65 is de-energized; whereupon, the stem 195 then reassumes the position shown in Fig. 6. The fueling valve F is automatically closed and the defueling valve DF is automatically opened, as previously described, so that all fuel in the pipe line 8 or any system connected therewith can be withdrawn or evacuated from the system through the pipe 11 to empty the system. Such emptying of the system serves as a safety measure and reduces the hazard of fire.

In the event of failure of the diaphragm 21, the spring 27 will close the valve F. Likewise, should the diaphragm 32 fail, the spring 39 will open the valve DF.

It is to be understood that various changes may be made in the details of construction and in arrangement of the several valves disclosed herein without departing from the principles of the invention or the scope of the annexed claims.

I claim:

1. A two-way valve and automatic control means therefor, comprising: a valve body containing two independently operable valves, one of said valves having an inlet and a normal outlet and fluid pressure operable means controlling flow between said inlet and outlet, the other of said valves having a return outlet and utilizing said normal outlet as its inlet; fluid pressure operable means controlling flow from said normal outlet to said return outlet, the fluid pressure operable means of said two valves being operable independently of each other; means controlling said one valve to maintain a substantially constant pressure on the normal outlet thereof; means controlling said other valve to relieve any excess pressure on said normal outlet of said one valve; and means responsive to pressure conditions on the normal outlet of said one valve for urging said one valve toward closed position to thereby reduce any excess pressure that may occur on the normal outlet of said one valve.

2. A two-way valve, comprising: a valve body having an inlet and an outlet; closure means controlling flow between said inlet and said outlet; a diaphragm connected with said closure means; and a pressure chamber at one side of said diaphragm; means controlling said valve including a pilot valve and a fluid pressure operable valve controlled by said pilot valve and connected in a conduit in by-passing relation to the pressure chamber of said main valve; a branch conduit connected with said by-pass conduit in advance of said fluid pressure operable valve and communicating with the pressure chamber of said main valve; a valve also connected in said by-pass conduit on the outlet side of said fluid pressure operable valve for controlling the flow of operating fluid through said by-pass conduit, whereby upon restriction of such flow through said by-pass conduit, operating fluid is caused to flow through said branch conduit to said pressure chamber to urge the closure means toward closed position; and means for operating said latter valve in said by-pass conduit in response to pressure conditions at the outlet of said main valve to maintain a substantially constant pressure therein.

3. A two-way valve, comprising: a body having an inlet and a normal outlet; partition means separating said inlet and outlet; a valve seat carried by said partition means; a valve disk cooperable with said seat to control flow from said inlet to said outlet; fluid pressure operable means including a pressure chamber for controlling the movement of said valve disk relative to said seat; means yieldably urging said valve disk toward said seat, said valve body also having a return outlet and partition means separating said return outlet from said normal outlet; a second valve seat mounted upon said last mentioned partition means; a second valve disk cooperable with said second seat for controlling flow from said normal outlet to said return outlet; means including a pressure chamber for controlling the movement of said second valve disk relative to said second valve seat; means yieldably urging said second valve disk in a direction away from said second valve seat; a pilot valve connected with the pressure chambers associated with said valve disks and arranged to exhaust operating fluid from the pressure chamber associated with said first valve disk to permit line pressure to move said valve disk away from its associated seat, and to supply operating fluid under pressure to the pressure chamber of said second valve disk to engage said second valve disk with its associated seat in opposition to the yieldable force tending to urge said second valve disk away from its seat; automatic means controlling the operation of said first valve disk to maintain a substantially constant pressure in said normal outlet chamber; and automatic means responsive to an excess pressure condition in said normal outlet for exhausting operating fluid from the pressure chamber associated with said second valve disk to move the same away from its seat, thereby relieving the excess pressure in said normal outlet chamber by discharge through said return outlet.

4. A fuel distribution system, comprising: a self-contained unit embodying a main valve consisting of a fueling valve and a defueling valve; means controlling said fueling valve to maintain a substantially constant pressure on the discharge side thereof; means responsive to an excess pressure condition on the outlet side of said fueling valve for effecting opening of said defueling valve to relieve said excess pressure condition; and means simultaneously controlling the operation of said fueling and defueling valves operable to simultaneously effect closing of one valve and opening of the other valve.

5. A fuel distribution system as defined in claim 4, including means responsive to an excess pressure condition on the downstream side of said fueling valve for effecting automatic closing of said fueling valve independently of the operation of the defueling valve.

6. A fuel distribution system as defined in claim 4, including: automatic means controlling the operation of said defueling valve and responsive to an excess pressure condition on the downstream side of said fueling valve for effecting opening of said defueling valve to relieve said excess pressure condition.

7. A fuel distribution system, comprising: a fuel storage tank; a main control valve embodying a normally closed valve having an inlet connected with said tank and also embodying a normally open defueling valve having a return outlet connected with said tank; a fuel distributing pipe connected with an outlet of said fueling valve and adapted to be placed in communication with said return outlet of said defueling valve; control means for simultaneously effecting opening of said fueling valve and closing of said defueling valve to permit flow of fuel from said tank to said distributing pipe; means controlling said fueling valve to maintain a substantially constant pressure in said distributing pipe; means for permitting opening of said defueling valve in the event that the pressure in said distributing pipe exceeds a predetermined given pressure; and means operable independently of said control means for effecting closing of said fueling valve simultaneously with the opening of said defueling valve.

8. A fuel distribution system, comprising: a fuel storage tank; a fueling valve having an inlet connected with said tank; a distribution pipe on the outlet side of said fueling valve, said fueling valve controlling the flow of fuel from said tank to said distribution pipe; a defueling valve connected with said distribution pipe; a return pipe connected with said defueling valve and with said tank for returning fuel from said distribution pipe to said tank; means controlling said valves for simultaneous operation arranged to effect closing of said defueling valve upon opening of said fueling valve; means for maintaining a substantially constant pressure in said distribution pipe; means responsive to pressure conditions in said distribution pipe for effecting opening of said defueling valve to relieve excess pressure in said distribution pipe; and means operable independently of said last-mentioned means and responsive to pressure conditions in said distribution pipe for effecting closing of said fueling valve upon the occurrence of an excess pressure condition in said distribution pipe.

9. A fuel distribution system, comprising: a fuel storage tank; a normally closed fueling valve having an inlet connected with said tank; a distribution pipe, said fueling valve having an outlet connected with said distribution pipe and controlling the flow of fuel from said tank to said distribution pipe; a normally open defueling valve conected with said distribution pipe; a return pipe connected with said defueling valve and with said tank for returning fuel from said distribution pipe to said tank; means controlling said valves for simultaneous operation arranged to effect opening of said fueling valve and closing of said defueling valve; and means operable in response to an excess pressure condition in said distribution pipe for effecting opening of said defueling valve to relieve excess pressure therein; and means also responsive to excess pressure in said distribution pipe for effecting closing of said fueling valve to reduce the pressure in said distribution pipe.

10. A fueling and defueling system, comprising: a fuel supply tank; a main valve having an inlet communicating with said fuel supply tank; a fuel distribution pipe for distributing said fuel, said valve having a normal outlet connected with said distribution pipe; a return pipe having one end thereof connected with said supply tank, said valve having a return outlet connected with the opposite end of said return pipe; a fluid pressure operable device controlling the flow between said inlet and normal outlet; a second fluid pressure operable device independent of said first-mentioned fluid pressure operable device for controlling the flow between said normal outlet and said return outlet; a pilot valve controlling the supply and exhaust of operating fluid to said fluid pressure operable devices and being arranged to exhaust operating fluid from one of said fluid pressure operable devices while supplying operating fluid under pressure to the other of said fluid pressure operable devices; means for varying the supply of operating fluid under pressure to said first-mentioned fluid pressure operable device to maintain a substantially constant pressure in said fluid distribution pipe; and other means operable in response to variations in pressure in said fluid distribution pipe for exhausting operating fluid from said fluid pressure operable devices, respectively, independently of said pilot valve.

11. A fueling and defueling system, comprising: a fuel supply tank; a common housing containing a fueling valve and a defueling valve; means connecting the inlet of said fueling valve with said fuel supply tank; a fuel distribution pipe connected with the outlet of said fueling valve; a return pipe having one end thereof connected with said fuel supply tank and its opposite end connected with a return outlet of said defueling valve, said normal outlet of said fueling valve serving as an inlet for said defueling valve; fluid pressure operable means controlling the flow of fuel from said inlet to said outlet of said fueling valve whereby to supply fluid to said distribution pipe; fluid pressure operable means controlling the flow from said outlet of said fueling valve to the return outlet of said defueling valve to return fuel from said distribution pipe to said storage tank; a pilot valve controlling the supply and exhaust of operating fluid to said fluid pressure operable devices, respectively; means responsive to pressure conditions in said fluid distribution pipe controlling said fueling valve to maintain a substantially constant pressure in said distribution pipe; additional means also responsive to pressure conditions in said distribution pipe controlling said defueling valve independently of said pilot valve to relieve any excess pressure condition above a predetermined pressure that may occur in said distribution pipe; and means also responsive to pressure conditions in said distribution pipe controlling said fueling valve independently of said pilot valve and operable to move said fueling valve toward closed position in the event of an excess pressure condition in said distribution pipe.

12. Apparatus for controlling the supply of fluid to, and the withdrawal of fluid from, a distribution pipe, comprising: a valve body having a first chamber adapted to be connected with a source of fluid supply, a second chamber adapted to be connected with said distribution pipe and a third chamber adapted to be connected with a return pipe; fluid pressure operable means controlling the flow of fluid between said first and second chambers; additional fluid pressure operable means actuatable independently of said first-mentioned fluid pressure operable means for controlling the flow between said second and third chambers; and means for controlling the supply and exhaust of operating fluid to said two fluid pressure operable means, including means for supplying operating fluid under pressure to one of said fluid pressure operable means while allowing the exhaust of operating fluid from the other of said fluid pressure operable means.

13. Apparatus for controlling the supply of fluid to, and the withdrawal of fluid from, a distribution pipe, comprising: a valve body having a first chamber adapted to be connected with a source of fluid supply, a second chamber adapted to be connected with said distribution pipe and a third chamber adapted to be connected with a return pipe; a first fluid pressure operable means controlling the flow of fluid between said first and second chambers; additional fluid pressure operable means actuatable independently of said first-mentioned fluid pressure operable means for controlling the flow between said second and third chambers; a main pilot valve controlling the supply and exhaust of operating fluid to said two fluid pressure operable means, including means for supplying operating fluid under pressure to one of said fluid pressure operable means while allowing the exhaust of operating fluid from the other of said fluid pressure operable means; and an auxiliary pilot valve responsive to pressure conditions on the downstream side of said second chamber for controlling the flow of operating fluid to said first fluid pressure operable means independently of said main pilot valve.

14. Apparatus for controlling the supply of fluid to, and the withdrawal of fluid from, a distribution pipe, comprising: a valve body having an inlet chamber adapted to be connected with a source of supply and having an outlet chamber adapted to be connected with said distribution pipe; fluid pressure operable closure means controlling the flow between said inlet and said outlet chambers, said valve body also having a return chamber; fluid pressure operable closure means controlling the flow between said outlet chamber and said return chamber; a pilot valve controlling the supply and exhaust of operating fluid to said two fluid pressure operable closure means and including means responsive to the pressure on the outlet side of said valve for effecting movement of said first-mentioned closure means towards closed position in event of occurrence of a pressure condition on said outlet side of said valve in excess of a predetermined pressure; and other pressure responsive means also responsive to the pressure on the outlet side of said valve for effecting movement of said second-mentioned closure means toward open position to relieve the pressure at the outlet side of said valve in the event that it exceeds said predetermined pressure.

15. Fluid flow control apparatus, comprising: a valve body having an inlet, an outlet, and a fluid pressure operable device controlling the flow between said inlet and outlet, said valve body also having a second outlet and a second fluid pressure operable device controlling the flow between said two outlets; means controlling the supply and exhaust of operating fluid to said pressure fluid operable devices including a pilot valve; conduit means connecting said pilot valve with said fluid pressure operable devices, respectively, and arranged to supply operating fluid under pressure to one of said devices while exhausting spent operating fluid from the other of said devices; and means responsive to pressure conditions upon the outlet side of said valve for controlling the supply of operating fluid to said first-mentioned fluid pressure operable device to maintain a substantially constant pressure condition on the outlet side of said valve.

16. Fluid flow control apparatus, comprising: a valve body having an inlet, an outlet and a fluid pressure operable device controlling the flow between said inlet and outlet, said valve body also having a second outlet and a second fluid pressure operable device controlling the flow between said two outlets; means controlling the supply and exhaust of operating fluid to said pressure fluid operable devices including a pilot valve; conduit means connecting said pilot valve with said fluid pressure operable devices, respectively, and arranged to supply operating fluid under pressure to one of said devices while exhausting spent operating fluid from the other of said devices; and means responsive to pressure conditions at said first-mentioned outlet for effecting the exhaust of operating fluid from at least one of said fluid pressure operable devices, independently of said pilot valve.

17. Fluid flow control apparatus, comprising: a valve body having an inlet, an outlet and a fluid pressure operable device controlling the flow between said inlet and outlet, said valve body also having a second outlet and a second fluid pressure operable device controlling the flow between said two outlets; means controlling the supply and exhaust of operating fluid to said pressure fluid operable devices including a pilot valve; conduit means connecting said pilot valve with said fluid pressure operable devices, respectively, and arranged to supply operating fluid under pressure to one of said devices while exhausting spent operating fluid from the other of said devices; and means responsive to pressure conditions at said first-mentioned outlet operable in response to a pressure condition in excess of a given pressure condition for effecting the exhaust of operating fluid from said second fluid pressure operable device to thereby interconnect said two outlets and relieve the excess pressure condition in said first-mentioned outlet.

18. Fluid flow control apparatus, comprising: a valve body having an inlet, an outlet, and a fluid pressure operable device controlling the flow between said inlet and outlet, said valve body also having a second outlet and a second fluid pressure operable device controlling the flow between said two outlets; means controlling the supply and exhaust of operating fluid to said pressure fluid operable devices including a pilot valve; conduit means connecting said pilot valve with said fluid pressure operable devices, respectively, and arranged to supply operating fluid under pressure to one of said devices while exhausting spent operating fluid from the other of said devices; and means responsive to pressure conditions at said first-mentioned outlet operable in response to a pressure above a given predetermined pressure for admitting operating fluid to said first-mentioned fluid pressure operable device to actuate the same to valve closing position independently of said pilot valve.

References Cited in the file of this patent

UNITED STATES PATENTS

| 2,067,229 | Birch | Jan. 12, 1937 |
| 2,417,994 | Sheets | Mar. 25, 1947 |
| 2,589,859 | Phillips | Mar. 18, 1952 |
| 2,600,876 | Jauch | June 17, 1952 |
| 2,661,761 | Samiran | Dec. 8, 1953 |